United States Patent Office 3,220,809
Patented Nov. 30, 1965

3,220,809
FUEL WITH A BASE OF BORON AND WITH A HIGH CALORIFIC POWER
Francis Debizé, Beauchamp, France, assignor to Societe Nationale d'Etude et de Construction de Moteurs d'Aviation, Paris, France, a company of France
No Drawing. Filed Oct. 26, 1961, Ser. No. 147,726
Claims priority, application France, Nov. 2, 1960, 842,815
5 Claims. (Cl. 44—51)

The invention relates to fuels with a high calorific power and a high density. It has more particularly for its object fuels of this kind which can be utilised for aircraft engines.

Efforts to obtain high performances in aeronautics have led to the study of a fuel having a high calorific power and a high density.

In order to facilitate its use, this fuel should preferably be liquid. It has therefore been sought to improve the characteristics of kerosene by adding to it metals or metalloids.

Boron would appear to be the most suitable additive for attaining the object desired, by reason of its high calorific power.

The constants of the constituents of the mixture contemplated are as follows:

|  | Boron | Kerosene |
|---|---|---|
| Density | 2.3 | 0.79 |
| Calorific power by weight (kcal./kg.) | 13,900 | 10,390 |
| Volumetric calorific power (kcal./l.) | 31,970 | 8,208 |

It can be seen that the addition of boron to kerosene or to a neighbouring hydrocarbon (such as petroleum spirit, white spirit, etc.) is capable of yielding a fuel having a high volumetric calorific power.

Unfortunately, however, it is not possible to obtain such a mixture directly, since the simple suspension of boron in these hydrocarbons is not stable.

The present invention makes it possible to obtain a mixture of good homogeneity by modifying the viscosity of the whole mixture.

In accordance with the invention, a fuel having a high calorific power and a high density is obtained by the mixture of a liquid hydrocarbon with granulated boron, the said granules being coated with a fatty substance. The hydrocarbon, which simultaneously plays the part of a solvent and a basic fuel, is advantageously an hydrocarbon having a range of distillation at a pressure of 760 mm. of mercury, comprised between 70° C. and 300° C., such as kerosene, petroleum spirit or white spirit. The applicant has found that white spirit is particularly suitable for the mixture, since it has a dispersive power higher than that of the other hydrocarbons, that is to say the granules of boron have less tendency to agglomerate in a mixture with a base of white spirit than in a mixture with a base of another hydrocarbon.

The boron granules can be present in the mixture in a proportion up to 60%, and have a mean size of grain less than about 15 to 20 microns and preferably less than 10 microns. The fatty substance with which the boron granules are coated, acting as a jellifying agent, is advantageously constituted by ammonium oleate, but the applicant has also obtained good results by using as a jellifying agent an ammonium ricinoleate, alone or added to the ammonium oleate.

Depending on the proportions of the various constituents, the preparation obtained will be liquid, or pasty. In the latter case, it will be easy to make it liquid, if so desired, by adding to it a further constituent, consisting of a liquid which preferably has a high calorific power.

In order to prepare the mixture, there is added to the hydrocarbon, while stirring, a small quantity of a fatty substance, i.e., oleic acid or castor oil, followed by the granulated boron and a quantity of ammonia sufficient to maintain the mixture in the state of suspension. While continuing the stirring, there is then added a quantity of the said fatty substance sufficient to obtain a perfectly liquid and homogeneous suspension.

It is an advantage to add a liquid lubricant to the preparation in order to make the product oily. This lubricant may be for example a vegetable, animal or mineral oil, but the applicant has found that mineral oils are particularly suitable for this purpose, especially anthracene oil which furthermore stabilizes the suspension. The lubricant is preferably added to the preparation immediately after the first addition of the jellifying fatty substance.

The preparation of the mixture is facilitated by the addition of an emulsifying agent. For example, an addition of sodium sulpho-ricinoleate in aqueous solution, immediately before the introduction of the granulated boron, improves the homogeneity and the stability of the mixture.

Example

The following example of composition, prepared for boron powder having a granular size of about 15 microns (that is to say, in the most unfavourable case) is capable of giving good results, the percentages indicated which are of course understood to be by weight, being furthermore capable of variation:

| | Percent |
|---|---|
| White spirit | 38.5 |
| Oleic acid | 3.5 |
| Anthracene oil | 4.0 |
| Sodium sulpho-ricinoleate | 1.5 |
| Water | 2.5 |
| Dehydrated boron powder | 48.0 |
| Ammonia, 22° Baumé | 2.0 |
| Total | 100.0 |

The method of operation is as follows:

Into a closed and heated tank fitted with a stirring device, there are introduced the white spirit, a part of the oleic acid (2%), the oil, the water plus sodium sulpho-ricinoleate prepared separately, the boron and the ammonia. The mixing is continued during an average of 15 minutes, after which the remainder of the oleic acid (1.5%) is added little by little until a perfectly liquid and homogeneous suspension is obtained.

As has been indicated above, this formula has been established for boron powder having a mean size of grain of about 15 microns, that is to say the most unfavourable case. For smaller granular sizes, the percentage of fatty substance can be reduced and the percentage of solvent (white spirit) can be increased.

In the formula given above, by way of example and without limitation, there has been employed a mineral oil in addition to the oleic acid; other oils may be employed, especially organic oils.

The above formula is also capable of being slightly modified and varied as regards the proportions of the constituents. In particular there may be added to the preparation a small proportion of an alcohol, for example 0.5 to 1% of ethylene glycol, in order to improve the behaviour of the mixture at low temperatures; the proportion of jellifying fatty substance can be reduced if dispersive products are introduced, for example, sulphonates; the proportion of boron can also vary between fairly wide limits.

In addition to the essential qualities of homogeneity and stability, the fuel according to the invention has the advantage of being a liquid fuel which, by virtue of the fatty substances employed, results in substantially uniform wear of all the accessory parts of the engines in which it is employed. In particular, this fuel does not obstruct the main flow of the injector, because of the stable suspension of the grains of boron.

There can be added with advantage to the fuel according to the invention, products which facilitate combustion, such as lithium and its compounds, or alternatively perchloric acid. For example, the applicant has obtained a particularly inflammable fuel by using boron powder and a mixture of perchloric acid and nitric acid.

It will of course be understood that it is possible to add to the fuel mixture, agents which prevent it from adhering to the walls of the piping systems, without thereby departing from the scope of the invention.

What I claim is:

1. A homogeneous, liquid fuel having high volumetric calorific power prepared by the steps comprising mixing a minor amount of a fatty substance selected from the group consisting of oleic acid and castor oil with a hydrocarbon having a distillation range between 70° C. and 300° C. at a pressure of 760 mm. of mercury, adding to such mixture, while stirring, up to 60% by weight of granulated boron having a mean size of grain less than 20 microns, jellifying the mixture by adding, while stirring, a quantity of ammonia sufficient to maintain the whole mixture in a state of suspension, then adding, little by little, while stirring, a quantity of said fatty substance sufficient to obtain a liquid and homogeneous suspension.

2. The fuel of claim 1 in which a lubricating oil is added immediately following the addition of the first amount of said fatty substance.

3. The fuel of claim 1 in which an emulsifying agent is added immediately preceding the addition of said granulated boron.

4. The fuel of claim 1 to which is added perchloric acid to promote the combustion thereof.

5. A liquid, homogeneous fuel having high volumetric calorific power prepared by the steps comprising mixing about 2% by weight of oleic acid with 38.5% by weight of white spirit, adding to such mixture about 4% by weight of anthracene oil and about 1.5 by weight of sodium sulpho-ricinoleate dissolved in about 2.5% by weight water, adding to the resultant mixture, while stirring, about 48% by weight of dehydrated boron powder having an average grain size of 15 microns, jellifying the mixture by adding, while stirring, about 2% by weight of a 22° Baumé solution of ammonia, then adding, little by little, while stirring, about 1.5% by weight of oleic acid, all percentages being by weight of said fuel.

References Cited by the Examiner

UNITED STATES PATENTS

| | | | |
|---|---|---|---|
| 1,484,190 | 2/1924 | Ray | 44—7 |
| 2,635,041 | 4/1953 | Hansley et al. | 44—51 |
| 2,885,360 | 5/1959 | Haden | 44—7 X |
| 2,927,849 | 3/1960 | Greblick | 44—51 X |

DANIEL E. WYMAN, *Primary Examiner.*